June 16, 1942. J. DAHL 2,286,471
FOCUSING SYSTEM
Filed Feb. 10, 1939
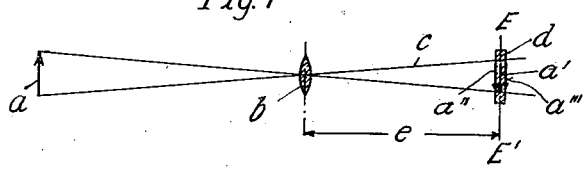
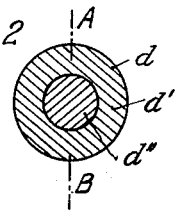
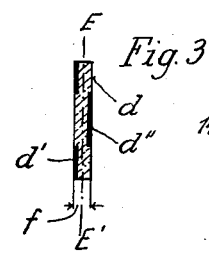
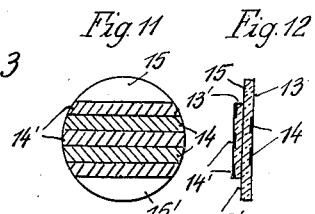
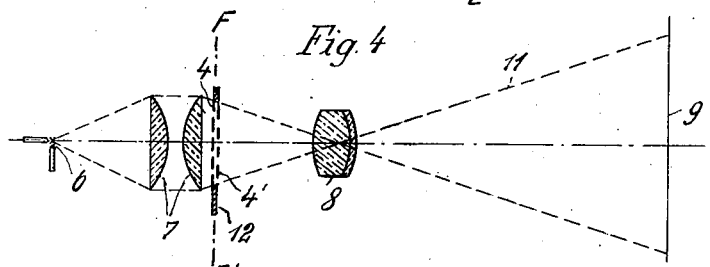
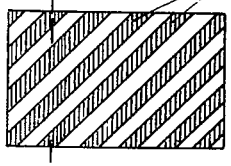
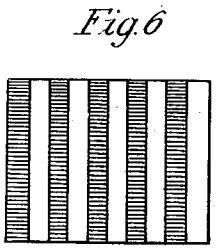
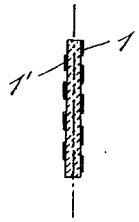
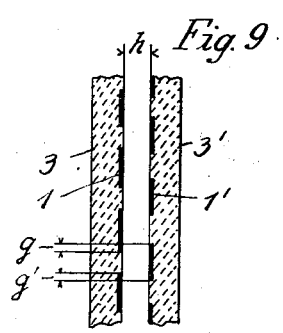
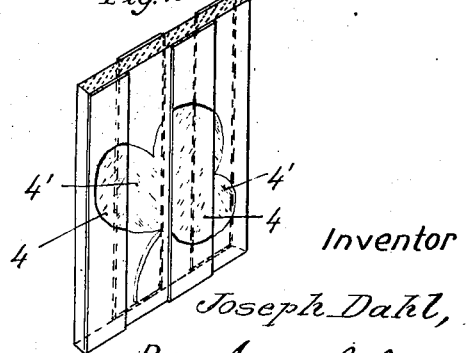
Inventor
Joseph Dahl,
By John Q. Brady
Attorney Patented June 16, 1942

2,286,471

UNITED STATES PATENT OFFICE 2,286,471

FOCUSING SYSTEM

Joseph Dahl, Schwerin, Germany

Application February 10, 1939, Serial No. 255,721
In Germany February 26, 1938

14 Claims. (Cl. 88—24)

This invention relates to a novel focusing system and element for optical systems or apparatus.

It is an object of the invention to facilitate the focusing of optical apparatus, such as, photographic and cinematographic cameras and projecting apparatus, spectral apparatus, epidiascopes or episcopes, microscopes, distance meters and the like.

A special object of the invention is to facilitate a sharp focussing of the projected image in projection apparatus.

With these and other objects in view, as may become apparent from the within disclosures, the invention consists not only of the structures herein pointed out and illustrated but includes further structures coming within the scope of what hereinafter may be claimed.

The character of the invention, however, may be best understood by reference to certain of its structural forms, as illustrated by the accompanying drawing in which—

Fig. 1 is a diagram showing purely schematically one embodiment of my novel focusing element inserted in the trace of the rays of an optical system.

Fig. 2 is a front view of an embodiment of my novel focusing element for use in the system shown in Fig. 1.

Fig. 3 is a section on line A—B of Fig. 2.

Fig. 4 is a diagram showing my novel system applied to a projecting apparatus.

Fig. 5 is a front view showing one mode of surface treatment of my novel focusing element.

Fig. 6 is a front view of another surface treatment.

Fig. 7 is a front view of a further surface treatment.

Fig. 8 is a section on line IV—IV of Fig. 5.

Fig. 9 is an enlarged cross section through a special design of my novel focusing element.

Fig. 10 is a perspective view of an embodiment of my focusing element as it may be used for projecting apparatus.

Fig. 11 is a front view and Fig. 12 a section on line C—D, showing a further embodiment of a focusing element used in my system.

Similar reference numerals denote similar parts in the different views.

As here shown, I insert in the trace of the rays a focusing element which is capable of producing or reproducing, respectively, an image by or in at least two axially spaced parallel planes and I adjust the optical system axially until the plane of optimum sharpness, or image plane, is disposed substantially half way between the two spaced planes of the focusing element.

As here shown, in projecting apparatus the adjustment is made so that the spaced planes of the focusing plate confine the object plane between them, since in this case the object plane takes the place of the image plane in cameras or the like apparatus.

As here shown, one embodiment of my novel focusing element comprises two parallel planes or surfaces each of which shows alternating complementary blank and image reproducing areas arranged, for instance, after the manner of a screen. Another embodiment shows alternating complementary blank areas and areas with transparent partial images. The separating lines between said complementary areas may be marked.

Preferably, and as here shown, the complementary image fields thus provided on the two faces of the focusing element are arranged to overlap each other by a small amount.

Referring now to the drawing in greater detail, and first to Figs. 1 to 3, the object to be reproduced is shown at $a$ and projected or reproduced on opaque areas provided on the opposite sides of a focusing element $d$ through a suitable optical system symbolized by the lens $b$ having an image distance $e$. One of the main rays of the system is indicated at $c$.

It will be clear that if the optical system $b$ would be accurately focused with respect to one of the opaque areas on either surface of the plate $d$, a sharp image $a''$ or $a'''$ of the object $a$ would be reproduced on the respective area. However, such sharp adjustment meets with difficulties because the human eye is unable to recognize small differences in the sharpness of images viewed in temporal sequence.

Now, I provide on the focusing element or adjusting plate $d$ two complementary image reproducing areas $d'$ and $d''$ (Figs. 2 and 3) which are axially spaced from each other by the thickness $f$ of the plate $d$. Thus, complementary partial images $a''$ and $a'''$ of the object $a$ are reproduced on the two planes $d'$ and $d''$ which images will show at least a slightly imperfect sharpness since they are not accurately in the plane E, E' defined by the image distance $e$. It is now possible to adjust the optical system in such a manner that the images $a''$ and $a'''$ show the same sharpness or imperfect sharpness. In this case, the plane E—E' which represents the accurate image distance will be accurately half way between the two surfaces $d'$ and $d''$ so that if the light-sensitive layer or the like is arranged in this plane half way between $d'$ and $d''$, an image of optimum sharpness will be produced.

In order to facilitate the comparison of the degree of sharpness of the images on the two planes $d'$ and $d''$, I prefer the provision of alternate complementary blank and opaque surface areas or partial images on the two spaced surfaces ($d'$ and $d''$), and the separating lines between adjacent areas or partial images may be marked in any suitable manner, such forms being shown in Figs. 5 to 10.

Referring first to Figs. 5 and 8, slanting opaque or ground strips 1 are provided on the front side of a sheet of glass alternating with blank intermediate strips and complementary opaque areas 1' are provided on the back of the sheet, in staggered relationship to the areas 1 on the front side. Preferably, the width of the areas 1 and 1' is such, with respect to the intermediate blank strips, that the areas 1 and 1' overlap each other at their edges by a small amount when viewing transversely through the sheet, as to form separating lines between the adjacent complementary areas.

Optionally, the ground or apaque areas may be in the forms shown in Fig. 6, or in the form of concentric rings, as shown in Fig. 7. Also, crosswise ground strips may be provided.

Where optical systems with very small focal length are to be adjusted, the distance between the spaced planes $d'$ and $d''$ (Fig. 3) must be very small to ensure an accurate setting and accordingly, an integral sheet having the image areas on its outer surfaces would have to be made very thin and thus tend to breakage in its use.

To avoid the said difficulties thus arising with small focal length of the optical system, I contemplate the use of two separate sheets 3 and 3', Fig. 9, arranged in parallel, with the ground areas 1 and 1' provided on their adjacent surfaces, with a spacing $h$ between said adjacent surfaces. It will be understood that the sharp real picture is in this case produced in a plane half way between the surfaces 1 and 1'. The said arrangement offers the additional advantage that the distance between the planes 1 and 1' may be made adjustable e. g. to meet different focal lengths, by the interposition of transparent spacer members (not shown) between the two sheets 3 and 3' or by any other suitable means. The overlapping portions have been designated $g$ and $g'$ and serve to form separating lines between the complementary areas 1 and 1'. By way of alternative, such separating lines may be provided on separate plates.

The opaque or ground areas $d'$ and $d''$ or 1 and 1', respectively, may be produced in any suitable manner, for example, by etching, grinding, blasting with quartz sand, emery powder or the like or by the application of a separate emulsion producing opacity of the covered area. Also, transparent artificial resin or glass having a filtering effect to intensify the contrasts of the image may be used for the production of my novel focusing element.

I have found that refraction phenomena are sometimes produced by the parallel opaque surfaces which in some instances may require a correction. To this end, I contemplate the provision of opaque areas of different structures, for example, of different graining or, in case of emulsions, of different grain size and/or gradation, whereby a uniform image impression is ensured.

The code of application of my novel focusing system for projection apparatus will now be described with reference to Figs. 4 and 10.

As will be seen from Fig. 4, the light of a source of light 6, for example, an electric arc lamp, is projected on a screen 9, through a condenser 7, the focusing element 12 and an objective lens 8. As shown in Fig. 10, the setting disc 12 in this case consists of a transparent sheet of glass or the like with relatively staggered complementary image portions 4 on the front and 4' on the back side of the sheet carrying component parts of any picture or image which is transparent or capable of projection.

The focusing element 12 is now inserted in the trace of the rays in the manner shown in Fig. 4, so as to be approximately in the plane F—F', defining the object plane for optimum sharpness of the projected picture. The partial images projected on the screen 9 by the partial transparent images 4, 4' will thus show an imperfect sharpness. The optical system is now adjusted until the image portions on the screen 9 derived from the partial images 4 on the one hand and from the partial images 4' on the other hand, show the same degree of sharpness, or imperfect sharpness. In this position, the plane F—F' of optimum sharpness is disposed half way between the planes 4 and 4' and, in order to obtain optimum sharpness, the object, diapositive, film or the like which is to be projected, must be placed in this plane F—F' or, in other words, the adjustment of the optical system is correct for the respective position of the object in this plane F—F'.

It is within the purview of my invention to provide a further area or areas on my novel focusing element which areas are half way between the end surfaces thereof, such arrangement being shown in Figs. 11 and 12 in which two sheets 13 and 13' of glass or the like of equal thickness are provided which are cemented together and make up together the full thickness required to provide the required spacing between their outer end faces which are provided with staggered opaque surface portions 14 and 14' corresponding to the opaque surface portions 1 and 1' in Fig. 8. The sheets 13 and 13' are of different size so that there remain upper and lower segments 15 and 15' on the surface of the larger sheet 13 adjacent to the sheet 13', which segments are preferably also opaque. The surfaces 15 and 15' thus formed may be used as bearing surfaces for inserting the plate unit in optical apparatus in a suitable position in engagement with the normal bearing surface of the camera or the like for the film or photographic plate, for instance, since said surfaces 15, 15' indicate the plane of optimum sharpness into which the light sensitive layer or the like has to be placed after the focusing operation has been finished and the plate 13, 13' has been removed. Moreover, where the segments 15 and 15' are also made opaque, they will facilitate the pre-setting or rough adjustment of the optical system for placing the plane of optimum sharpness in the neighborhood of the focusing element. To this end, the optical system is at first adjusted in a manner to obtain approximately optimum sharpness on the segments 15 and 15' while the final adjustment is then effected by matching the degrees of sharpness of the areas 14 and 14'.

It will be understood that a similar device as that shown in Figs. 11 and 12 may be used for projection apparatus and in this case, of course, transparent partial images would replace the opaque areas 14, 14' and 15, 15'.

It should be noted that my novel focusing system may be used in any optical apparatus where it is required to effect a sharp adjustment of the real image. For example, my novel setting element may be inserted in front of the ocular of a distance meter, telemeter or range finder, to facilitate an accurate distance measuring.

I am aware that many further changes may be made and numerous details of construction may be varied through a wide range without departing from the principles of this invention, and I, therefore, desire it understood that no limitations upon my invention are intended except as may be imposed by the scope of the appended claims.

I claim:

1. A device for focusing optical apparatus, comprising means for visibly producing substantially complementary partial images in at least two parallel planes which are axially spaced from each other, said means comprising strip-shaped screen surfaces alternating with blank intermediate surfaces in each of said parallel planes, in a staggered complementary relationship, whereby a comparison of the sharpness of the partial images produced by said spaced planes is facilitated.

2. A device according to claim 1, in which the separating lines between said alternating surfaces are marked.

3. A device according to claim 1, in which the adjacent staggered screen surfaces on the spaced planes overlap each other by small amounts in a manner to form visible separating lines between said staggered surfaces.

4. In optical apparatus, an arrangement for focusing said optical apparatus, comprising an optical system, at least one substantially non-flexible sheet of transparent material having mutually staggered complementary optical surface areas in parallel axially spaced planes and being inserted in said optical system in image producing position, and means for adjusting said optical system to match the degree of sharpness in images corresponding to said complementary surface areas.

5. In optical recording apparatus, an arrangement for focusing said optical apparatus, comprising an optical system, at least one substantially non-flexible sheet of transparent material having mutually staggered complementary opaque surface areas in parallel axially spaced planes and being inserted in said optical system in image producing position for focusing said recording apparatus, and means for adjusting said optical system to match the degree of sharpness in images produced on said complementary opaque surface areas.

6. In optical projection apparatus, an arrangement for focusing said optical apparatus, comprising an optical system, at least one substantially non-flexible sheet of transparent material having mutually staggered complementary surface areas including transparent partial images in parallel axially spaced planes and being inserted in said optical system in image producing position for focusing said projection apparatus, and means for adjusting said optical system to match the degree of sharpness in images produced from said transparent partial images.

7. In optical apparatus, an arrangement for focusing said optical apparatus, comprising an optical system, a focusing element inserted in said optical system in image producing position and comprising two rigid sheets of transparent material arranged in a parallel axially spaced relationship and carrying mutually staggered complementary image producing surface areas on their inner spaced surfaces, and means for adjusting said optical system to match the degrees of sharpness in images produced from said complementary surface areas.

8. In optical apparatus, an arrangement for focusing said optical apparatus, comprising an optical system, a focusing element inserted in said optical system in image producing position and comprising two rigid sheets of transparent material arranged in a parallel axially spaced relationship and carrying mutually staggered complementary opaque surface areas on their inner spaced surfaces, and means for adjusting said optical system to match the degrees of sharpness in images produced on said complementary opaque surface areas.

9. In optical apparatus, an arrangement for focusing said optical apparatus, comprising an optical system, a focusing element inserted in said optical system in image producing position and comprising two rigid sheets of transparent material arranged in a parallel axially spaced relationship and carrying mutually staggered complementary optical surface areas on their adjacent surfaces, and means for adjusting said optical system to match the degrees of sharpness in images corresponding to said complementary surface areas.

10. In optical apparatus, an arrangement for focusing said optical apparatus, comprising an optical system, a focusing element inserted in said optical system in image producing position and comprising two rigid sheets of transparent material arranged in an adjustable parallel axially spaced relationship and carrying mutually staggered complementary optical surface areas on their surfaces, and means for adjusting said optical system to match the degrees of sharpness in images corresponding to said complementary surface areas.

11. A focusing device for optical apparatus, comprising means for visibly producing substantially complementary partial images by at least two parallel planes which are axially spaced from each other, said means including an element having a colour filtering effect intermediate said two parallel planes by which contrasts are intensified for differentiating said partial images.

12. A device for focusing optical apparatus, comprising a glass plate composed of two parallel transparent plates of equal thickness and different size in superposed relation, and having mutually staggered, complementary opaque surface areas on its three parallel outer surfaces, two of which surfaces are in stepped relation.

13. In optical apparatus, an arrangement for focusing said optical apparatus, comprising an optical system, at least one substantially non-flexible sheet of transparent colour filtering material having mutually staggered complementary opaque surface areas in parallel axially spaced planes and being inserted in said optical system in image producing position, and means for adjusting said optical system to match the degree of sharpness in images produced on said complementary opaque surface areas, said colour filtering material having a contrast intensifying effect for differentiating the images on said complementary surface areas.

14. In optical apparatus, an arrangement for focusing said optical apparatus, comprising an optical system, a focusing element inserted in said optical system in image producing position and comprising two rigid sheets of transparent colour filtering material arranged in a parallel axially spaced relationship and carrying mutually staggered complementary opaque surface areas on their inner spaced surfaces, and means for adjusting said optical system to match the degrees of sharpness in images produced on said complementary opaque surface areas, said colour filtering material having a contrast intensifying effect for differentiating the images on said complementary surface areas.

JOSEPH DAHL.